June 17, 1969  R. H. LAGARDE  3,450,810
METHOD OF FORMING A COUPLING DEVICE
Original Filed Feb. 19, 1965  Sheet 1 of 5
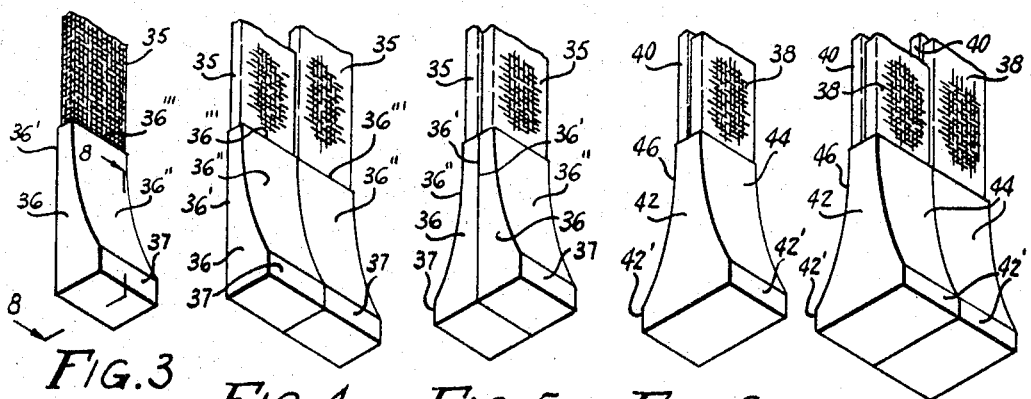
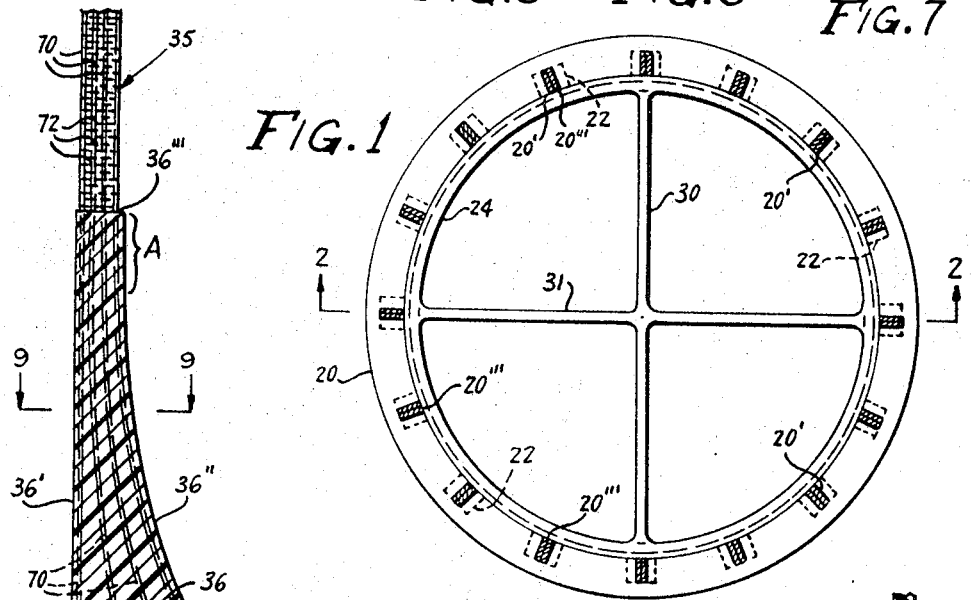
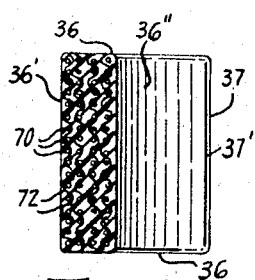
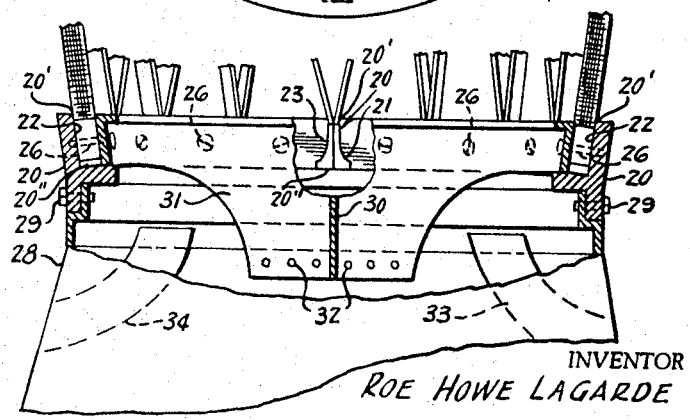
INVENTOR
ROE HOWE LAGARDE
BY Meyer, Tilberry & Body
ATTORNEYS June 17, 1969   R. H. LAGARDE   3,450,810
METHOD OF FORMING A COUPLING DEVICE
Original Filed Feb. 19, 1965   Sheet 2 of 5

INVENTOR
ROE HOWE LAGARDE

BY Meyer, Tilberry & Body
ATTORNEYS

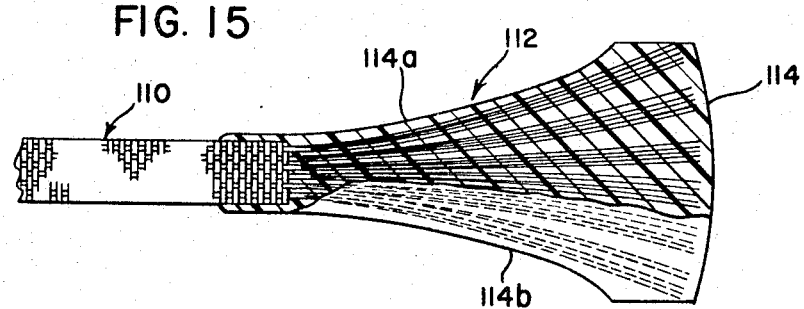
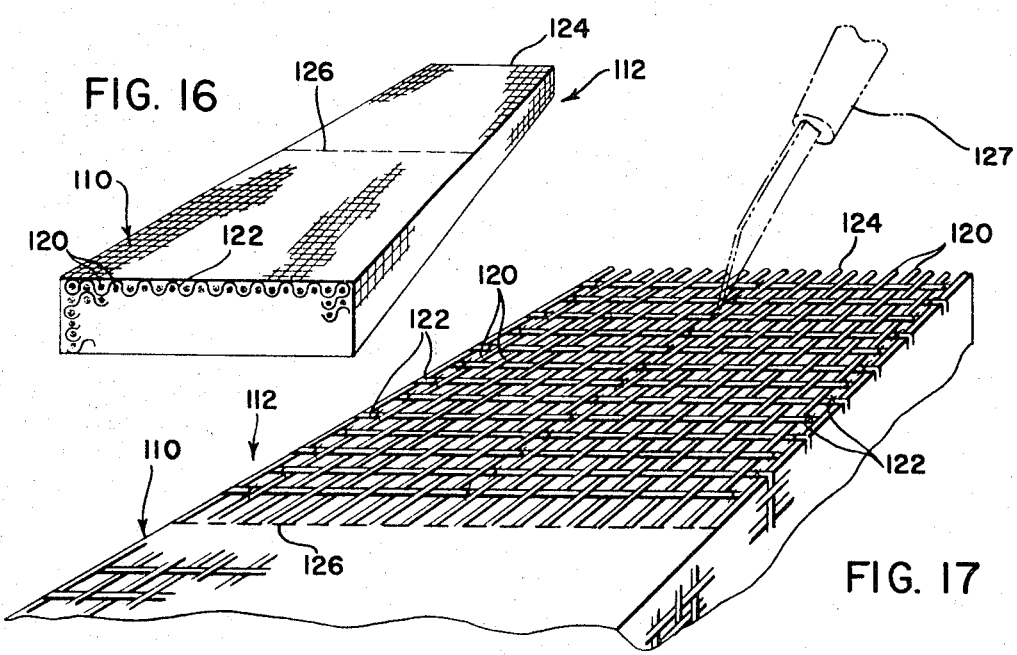
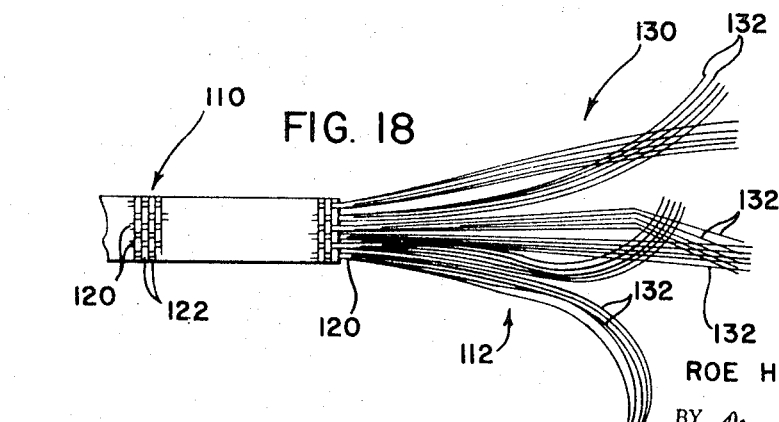

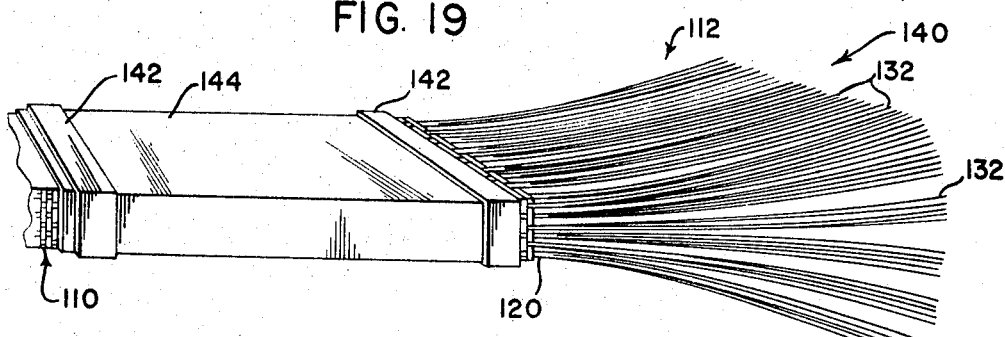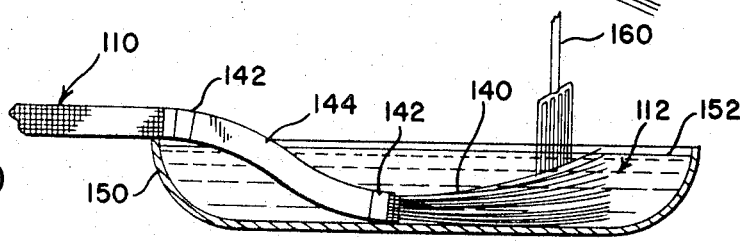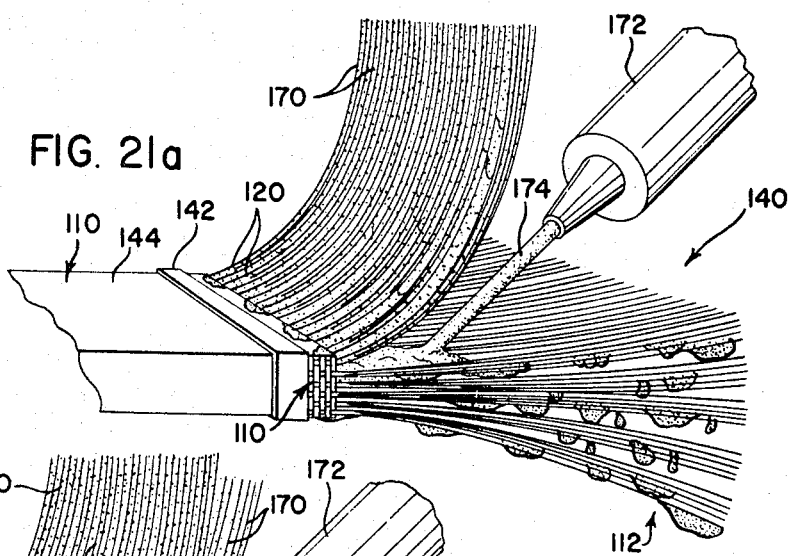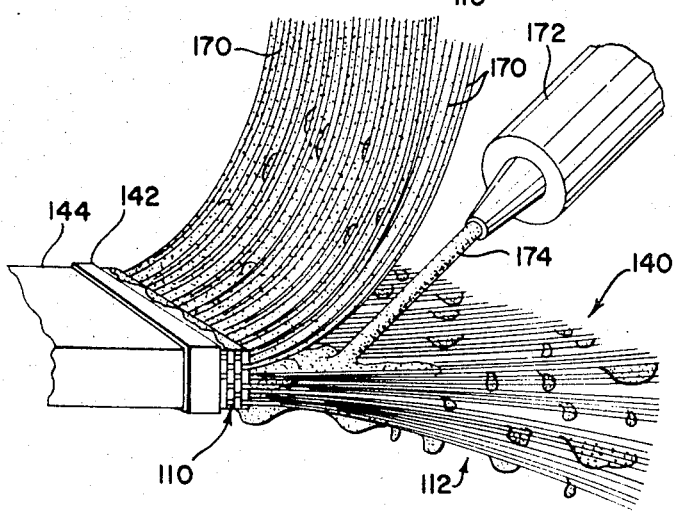

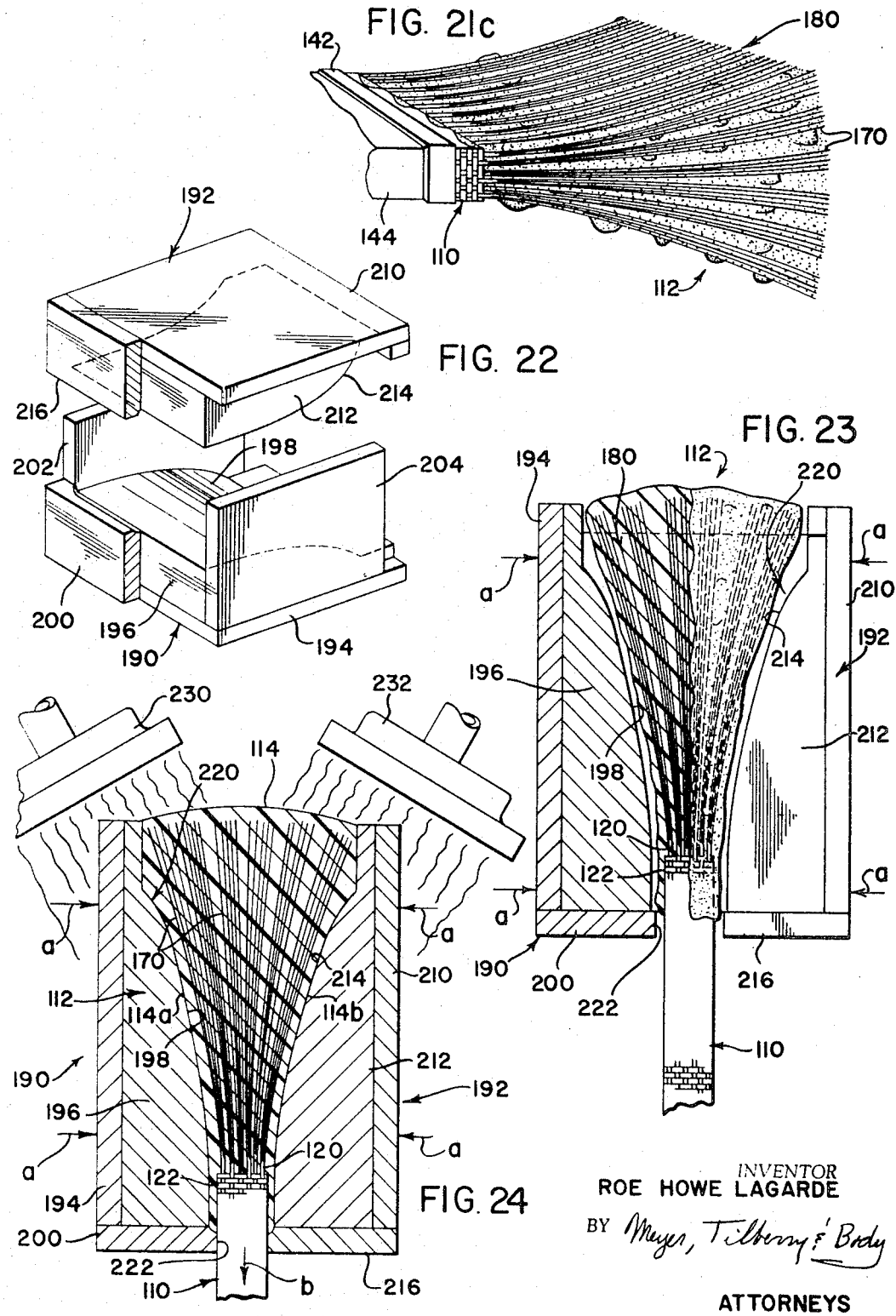

United States Patent Office
3,450,810
Patented June 17, 1969

3,450,810
METHOD OF FORMING A COUPLING DEVICE
Roe Howe Lagarde, Oxford, Md., assignor to E. W. Bliss Company, Canton, Ohio, a corporation of Delaware
Application Feb. 19, 1965, Ser. No. 438,459, now Patent No. 3,263,289, dated Aug. 2, 1966, which is a continuation-in-part of application Ser. No. 492,973, Sept. 10, 1965. Divided and this application May 13, 1966, Ser. No. 549,915
Int. Cl. B29g *1/00;* B28b *23/00;* B29c *6/04*
U.S. Cl. 264—137                                    5 Claims

---

ABSTRACT OF THE DISCLOSURE

There is provided a method of forming a plastic coupling lug on the end of woven, plastic tape having transverse and longitudinal strands, each strand being formed of many individual plastic filaments. In accordance with this method, the transverse strands at the end of the tape are removed which cause an unravelling of the plastic filaments into an oriented mass. These filaments are then oriented and coated with an uncured plastic material. Then the plastic is molded and cured to provide a plastic lug with the filaments homogeneously distributed therethrough.

---

This application is a divisional application of my copending application Ser. No. 438,459, filed Feb. 19, 1965, now Letters Patent No. 3,263,289.

This application is also a continuation-in-part application of copending application Ser. No. 492,973, filed Sept. 10, 1965, now Letters Patent No. 3,264,017. Application Ser. No. 438,459 is a continuation-in-part application of my copending application Ser. No. 286,047, filed June 6, 1963, now abandoned, which is in turn a continuation-in-part application of my copending application Ser. No. 279,672 filed May 9, 1963, now abandoned, which was in turn a continuation-in-part application of my copending application Ser. No. 154,011 filed Nov. 21, 1961, now abandoned, which was in turn a continuation-in-part application of my copending application Ser. No. 83,442 filed Jan. 18, 1961, now abandoned.

Application Ser. No. 438,459 was also a continuation-in-part of application Ser. No. 279,672, filed May 9, 1963.

The present invention relates primarily to a band attaching device for holding the ends of flexible cords or woven bands and for attaching the same to an object to be suspended thereby and to the method of making this device.

This construction is particularly designed to hold the ends of flexible bands such as parachute strands, but is not to be limited thereto, wherein the bands are provided with a lug at the ends thereof as set forth in detail in two of our prior patent applications. These lugs are generally formed from an organic plastic material, and when allowed to fully set are in a substantially rigid form with a slight built-in resiliency.

In accordance with the present invention, there is provided a device for coupling a flat tape, including a plurality of longitudinally and transversely extending strands, onto a support member. This device includes a coupling member having a cavity with diverging side walls terminating at the converging ends of the side walls in a slotlike opening; means for mechanically securing the coupling member onto the support member; the longitudinally extending strands being unwoven from the transversely extending strands adjacent one end of the tape; a plastic lug molded around the unwoven longitudinally extending strands with the longitudinally extending strands being distributed throughout the lug; the lug having a transverse cross section with diverging side walls generally matching the diverging side walls of the cavity; and, the lug being received in the cavity with the side walls of the lug bearing against the side walls of the cavity and the tape extending through the cavity opening.

By using the structure defined above, the unwoven longitudinal strands of the tape are evenly distributed throughout the molded lug while the transversely extending strands are removed. This gives homogeneous distribution of the longitudinally extending strands and greatly increases the maximum holding force of the coupling device.

In accordance with another aspect of the present invention there is provided a method of forming an attaching lug on the terminal end of a tape formed from a plurality of interweaved longitudinally and transversely extending strands. This method comprises the steps of: removing the transversely extending strands adjacent the terminal end of the tape; applying a curable material onto the longitudinally extending strands adjacent the terminal end; providing a mold having opposite diverging side walls terminating at the converging ends of the side walls in a slot-like opening; placing the tape into the mold with the tape extending through the opening and the terminal end opposite to the diverging side walls; curing the material while the tape is positioned in the mold; and, then, removing the tape from the mold.

The primary object of the invention is to provide a novel and quick way of attaching bands to an object.

Another object of the invention is to provide a novel way of securing the ends of two or more bands within a single cavity, or part carried by the device.

A further object of the invention is the novel manner in which the plastic lug is secured to the flexible bands.

Another object of the present invention is the provision of a method of forming an attaching lug on the terminal end of a tape formed from a plurality of interweaved longitudinally and transversely extending strands, which method is economical to perform and provides a more rigid bond between the lug and the strands than heretofore obtainable.

Still a further object of the present invention is the provision of a method of forming an attaching lug on the terminal end of a tape formed from a plurality of interweaved longitudinally and transversely extending strands, which method provides a bond between the lug and strands at all areas of the strands within the lug.

While several objects of the invention have been pointed out other objects will become apparent as the nature and use of the invention becomes more apparent from the specification with reference to the accompanying drawings.

The invention is illustrated in the following drawings, in which:

FIGURE 1 is a plan view of one form of the attaching device;

FIGURE 2 is a fragmentary sectional view taken along line 2—2 of FIGURE 1 illustrating a manner of securing the band attaching means to a capsule, or the tail end of an airplane for braking the same;

FIGURE 3 is a perspective view of a single curved face tapered lug to be used in the end of the band for securing the same to the band attaching device;

FIGURE 4 is a perspective view similar to that shown in FIGURE 3 wherein two separate lugs are used side by side in a single cavity;

FIGURE 5 is a perspective view similar to that shown in FIGURE 4 wherein the lugs are placed back to back;

FIGURE 6 is a perspective view illustrating a single double curved face tapered lug attached to the end of two bands;

FIGURE 7 is a perspective view similar to FIGURE 6 wherein two separate, double curved face tapered lugs are used side by side;

FIGURE 8 is an enlarged sectional view taken on line 8—8 of FIGURE 3;

FIGURE 9 is a sectional view taken along line 9—9 of FIGURE 8;

FIGURE 15 is a partial cross-sectional view illustrating a further modification of the present invention;

FIGURE 16 is a partial pictorial view showing a step in the method of forming a lug on the end of a woven tape;

FIGURE 17 is an enlarged pictorial view showing, somewhat schematically, another step in the method of forming a lug;

FIGURE 18 is a side elevational view showing a further step in the method of forming a lug;

FIGURE 19 is a pictorial view illustrating still a further step in the method of forming a lug;

FIGURE 20 is a partially cross-sectioned view showing still a further step in the method of forming a lug;

FIGURES 21a, 21b and 21c are pictorial views showing, progressively another step in the method of forming a lug;

FIGURE 22 is an exploded, pictorial view showing the mold used in the method of forming a lug;

FIGURE 23 is a side elevational view showing another step in the method of forming a lug; and, FIGURE 24 is a side elevational view showing the final step in the method of forming a lug.

Like character references are used to point out like and similar parts throughout the several views.

Figure 12:
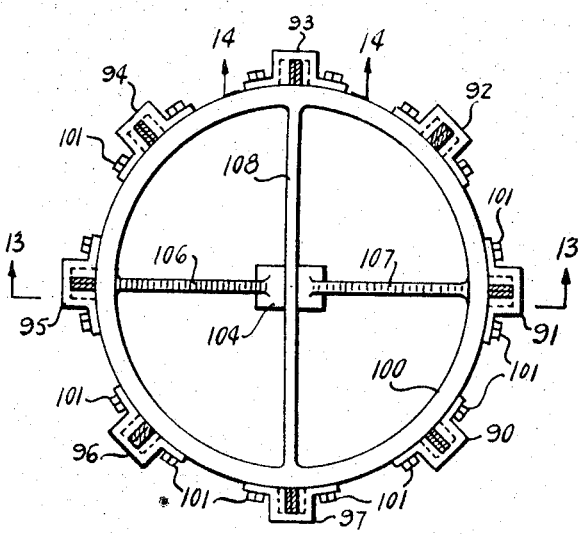
FIGURE 12 is a view of a still further modified form of the attaching device.

Referring in particular to FIGURES 1 and 2 the attaching means comprises a rigid lug supporting element in the form of ring 20 which is provided with a plurality of lug receiving cavities 22. Each cavity is integrally formed within the ring with curved tapered ends and is open at its upper end 20', the bottom 20" of the cavity 22 is closed by being integrally formed in the ring, as shown in FIGURE 2, or the bottom may be closed by a separate element (not shown) or any other suitable means.

The cavity 22 shown particularly in FIGURE 2, is provided with two opposite tapered end walls 21 and 23 and is adapted for use with the type of lug shown in FIGURES 3 and 5, wherein the lug is provided with one straight end wall and the lugs are placed in the cavity back to back. The inner side 20''' of the cavity is open and is closable by a second ring 24. For convenience the tapered walls and the wall opposite a tapered wall are referred to as end walls and the opposite parallel walls are referred to as side walls. The ring 24 is secured to the ring 20 by bolts or studs 26. The ring 20 is shown in FIGURE 2 attached to a capsule or other object 28 to be suspended by means of bolts 29. In order to better secure the attaching means to the suspended object, a means such as plates 30 and 31 are carried by the ring 24 which is also attached to the object 28 by means such as bolts or studs adapted to extend through the openings 32. The attaching device as shown in FIGURES 1 and 2, being of ring formation normally has a hollow center, which allows for the passage of air therethrough. In case the top of the suspended object is provided with a closed top, conduits 33 and 34 are provided to convey air toward the center of the ring for better operation of the parachutes. These conduits may be provided with controls (not shown) to regulate the air admitted therethrough.

The lugs may be formed in various ways. One form is shown in FIGURE 3 wherein the lug 36 is formed on the end of a single band 35 the lug having one straight end portion 36' and a curved tapered end portion 36". This form may be used side by side in the same lug receiving cavity as shown in FIGURE 4 or they may be used back to back as shown in FIGURE 5.

The lugs may be formed as shown in FIGURE 6 wherein two bands 38 and 40 are placed in a single lug 42. The lug 42 is formed with double curved tapered end faces 44 and 46. The lug receiving means, or cavity may be of such dimension as to receive a single lug, as shown in FIGURE 6, or two lugs as shown in FIGURE 7.

The general structure and formation of the several lugs are quite similar, their shape depends to a large extent upon the particular use and manner in which they are to be employed together with their practical application to a particular use and the economy in their construction.

The combination lug and woven cord or band structure is of importance to the extent, that the band must be tied to the lug in such a manner as to assure complete attachment between the two. The method of forming the lugs onto the band will be hereinafter described in detail. Referring to the arrangement of the woven cord or band, each must be unravelled for some distance from its end. This unravelled portion extends substantially throughout the curved portion of the lug and preferably for a further distance toward the smaller end of the lug. The unwoven strands are extended outwardly toward the end of the cord, or band substantially parallel with the elongated axes of the cord or band, as shown at 70 in FIGURE 8 and spread throughout the area to be occupied by the lug. The plastic material from which the lug is to be formed is then injected about the spread strands, which are held within a suitable mold (not shown) or in the cavity in which the lug will be secured. In forming the lug it is preferable to form a heavy outer end or bottom portion, as shown at 37 in FIGURES 3 to 5 and at 42' in FIGURES 6 and 7, sometimes referred to as a head, to back up the pressure being exerted on the curved faces of the lug to prevent the lug from being drawn too far into the neck, or smaller end of the cavity whenever the band is under extreme heavy tension.

Referring in particular to the band shown in FIGURES 8 and 9, the band is woven with lateral or weft strands 72 and longitudinal or warp strands 70. The end of the band is unbraided, or unwoven by removing the lateral, or weft strands 72 for at least a distance throughout the curved end surfaces of the lug, and preferably to a line adjacent the narrow end 36''' of the lug. There is no limit to the length of the longitudinal strands 70, and if desired may extend from the end of the woven portion adjacent the small end of the lug outwardly to and including the outer enlarged end 37 of the lug.

The material used in construction of the lug is preferably of a semi-liquid of solidifiable organic plastic type. However, other suitable substances may also be used, such as, cement, rubber, epoxy, etc. Nor is the substance to be limited to a solidifiable liquid, or semi-liquid, but may be of a granular material to which heat and pressure may be applied for solidification, or a solidifying agent may be added to the material within the mold fixture, depending on the method desired. This solidifying substance is compounded to solidify into a solid or semi-solid lug, filling the spaces between the strands 70 and adhering to the strands themselves to form a rigid or semi-rigid mass. It has been found in tests, that if the lug is slightly resilient its holding qualities are a great deal better. However, the lug must be of such solidity as to be held within the cavity, when the band is under extreme heavy tension.

In the form of lug 36, shown in FIGURES 3, 4, 5 and 8 the lug is provided with one strraight end 36' and a curved surface 36", the lateral sides of the lug being in parallel planes. The advantage of this particular form, is that, two bands may be enclosed in a single cavity, which is more economical and at the same time both bands will get substantially the same holding power within the one cavity. Whether the lug is provided with a single or double curved tapered face, the curved face portions have substantially the same degree of curvature.

Referring further to FIGURES 3 and 8, the tapered curved face portion of the lug is shown being in the form of a gradual concaved surface 36". Beginning with a portion A, which is substantially parallel with the extending woven band portion 35, adjacent the neck end 36''' of the lug, the concaved portion 36" extends from the outer end of the portion A to the line 37', the inner edge of the head portion 37. The head portion 37 may vary slightly in thickness depending upon the amount of stress it will be required to carry. The degree of curvature of the curved surface of the lug gradually increased as the surface is extended from the inner end of the parallel portion A to the line 37' adjacent the head 37. By making the lug of a slightly resilient material the parallel portion A will not receive the high pressure to which the tapered surfaces are subjected which will reduce the compression in the neck area and allow for a slight movement of the portion A and reduce compression on the strands embedded therein and allow the remainder of the lug including the curved surface of the lug carrying the extended ends of the warp strands to progressively take up the load. This particular configuration of the lug including the curved face allows for a minimum holding of the strands in the neck area of the lug, which has hereberfore had a tendency to break at this point.

Figure 10:
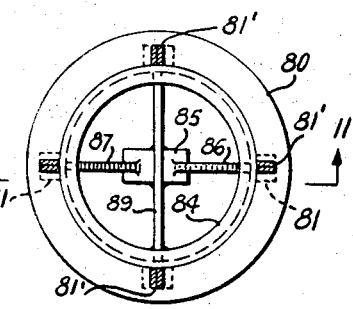
FIGURE 10 is a plan view of a modified form of the attaching device.
Figure 11:
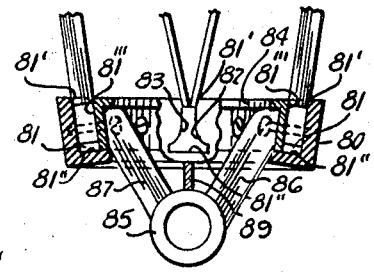
FIGURE 11 is a sectional view taken along line 11—11 of FIGURE 10.

Referring now to FIGURES 10 and 11, the holding device is constructed with a substantially smaller diameter and is adapted more to the dropping of cargo, supplies, etc. The ring 80 is somewhat similar in construction of ring 20, shown in FIGURES 1 and 2. The ring 80 is provided with a plurality of lug receiving means in the form of recess 81, having an open top 81', a closed bottom 81" and an open side 81'''. The walls of the cavity are formed with curved tapered surfaces 82 and 83 in which the curved surfaces extend inwardly and outwardly from the open end portion 81' of the cavity. There is provided a second ringlike member 84 which fits snugly against the inner face of the ring 80 and is adapted to close the side openings of all of the cavities 81. Secured to the inner ring 84 are means for connecting the attaching device to the cargo, supplies etc. as the case may be. The connecting means is in the form of a small ring 85, positioned below the rings 80 and 84 by members 86, 87 and 89 through which a suitable tie may be made with the article to be suspended.

Figure 13:
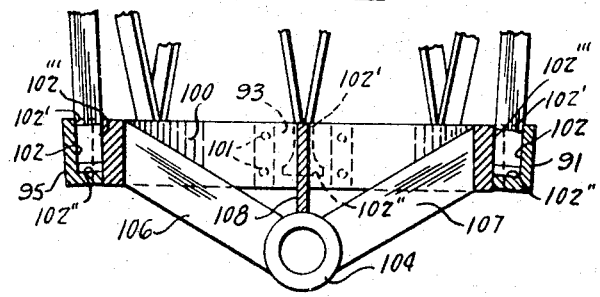
FIGURE 13 is a sectional view taken along line 13—13 of FIGURE 12.
Figure 14:
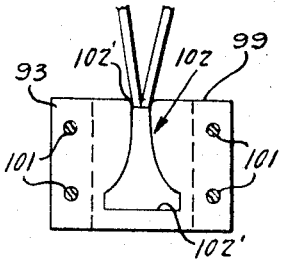
FIGURE 14 is a vertical view in elevation of one of the band holding elements shown in FIGURES 12 and 13.

In referring to a still further modified form of the invention, reference is directed to FIGURES 12, 13 and 14. In this form, each lug is held by an individual holding means. These holding elements are designated by numerals 90 to 99 inclusive. The purpose of this form of the invention is somewhat similar to that shown in FIGURES 10 and 11. The individual holding elements are attached to a ring 100 by suitable bolts or studs 101. The holding elements are formed with a cavity 102 having an open top 102' and a closed bottom 102" and an open side 102'''. The individual holding elements are secured to the ring 100 in such a manner that the ring covers the open side of the cavities.

For supporting the object or objects to be suspended is a ring 104 similar to ring 85 shown in FIGURE 11. The ring 104 is attached to the ring 100 by members 106, 107 and 108.

While rings 85 and 100 have been shown as means for tying cargo and the like to the attaching device, any other conventional means may be used, such as a hook or other suitable means.

In FIGURE 14 the cavity 102 is shown being occupied by the form of lug shown in FIGURE 6, where two bands are secured to a single lug. However, any suitable combination of bands and lugs may be used, provided a proper cavity is constructed to receive the particular type of lugs desired.

Referring now to FIGURE 15, there is illustrated another embodiment of the present invention wherein a relatively flat tape 110 is provided at its terminal end 112 with a plastic lug 114. In accordance with this embodiment, the lug 114 has two outwardly diverging bearing surfaces 114a, 114b with the radii of these surfaces gradually increasing from a small radius at the outer end of the lug to a large radius at the inner end of the lug. An important aspect of the present invention is the method by which the plastic lug 114 is secured onto the unwoven, longitudinally extending strands within tape 110. This method will be hereinafter described in detail.

In FIGURE 16, the relatively flat tape 110 is schematically represented as being formed from a plurality of longitudinally extending strands 120 and transversely extending strands 122. Strands 120 and 122, correspond to strands 70 and 72, respectively, as shown in FIGURES 8 and 9. Each of these individual strands are, in turn, formed from a plurality of separate filaments and, in accordance with the preferred embodiment of the present invention, these individual filaments are nylon filaments. Before the lug 114 is formed onto the terminal end 112, the end of tape 110 is cut to produce a squared edge 124. When the tape has a width of approximately eight inches, a line 126 is scribed across both large flat surfaces of tape 110 a distance approximately two inches from edge 124. The spacing of line 126 from edge 124 may be varied according to the desired longitudinal length of lug 114 which, in some instances, is determined by the width of tape 110.

Referring now to FIGURE 17, after the tape has been marked at line 126, a knife or other instrument 127, shown in phantom lines, is utilized for cutting the transverse strands 122 within the area between line 126 and edge 124. A sufficient number of cuts, indicated by x, are made in the terminal area of tape 110 so that the transversely extending strands 122 may be separated from the longitudinally extending strands 120 leaving only the strands 120 in an unwoven condition. Since strands 120 are each formed from a plurality of small plastic filaments, these filaments tend to unwind or unravel to produce a mass 130 of unoriented filaments 132. See FIGURE 18. This produces a somewhat entangled broom-like head on the end of tape 110. A comb or other such instrument may be used for orienting the various filaments 132 in the unoriented mass 130 of FIGURE 18 to produce what can be termed an oriented mass of filaments 140, shown in FIGURE 19. During this combing operation, any remaining segments of transverse strands 122 are removed from the mass 140. It should be appreciated that, in some instances, the longitudinally extending strands 120 may not form into a somewhat oriented mass 130; therefore, a separate combing operation may not be required to orient the filaments protruding outwardly from the end of the tape. The necessity for this filament orientation, is determined primarily by the particular type of longitudinal strands found in tape 110 and the care utilized in removing the transverse strands from the terminal end of the tape. However, the combing operation is usually used to remove the segments of transverse strands entrapped within the mass 140 even if filament orientation is not needed. To prevent plastic material from adhering onto the surfaces of tape 110, during the subsequent proceesing operations, bands 142 of masking tape are used for holding a masking material 144 onto the surface of the tape. This masking material and the forward band 142 extend to a position immediately adjacent the unwoven portion of the tape, as shown in FIGURE 19. The oriented mass 140 of oriented filaments are ready to be coated with a curable plastic material.

Referring now to FIGURE 20, the tape 110 is placed within a shallow pan 150 which is filled with an appropriate curable material 152. The curable material 152 may take a variety of forms; however, in practice, this material is epoxy resin, an adhesive, synthetic or natural resin, or rubber. When the oriented mass 140 is within pan 150, the material 152 is forced into the crevices between the filaments by an instrument, such as a common table fork 160. The tape is repeatedly turned so that the fork 160 can work the material 152 into the oriented filament mass 140.

It has been found that the extremely large surface area, caused by the multitude of small filaments forming oriented mass 140, prevents a complete wetting of all filament surfaces by the dipping and working step illustrated in FIGURE 20. Consequently, in accordance with the present invention as shown in FIGURE 21a, an upper layer or group of filaments 170 is forced upwardly away from the mass 140 so that an applicator 172 can apply additional curable material 174 between this lifted group of filaments and the remaining filaments within the mass 140. This assures a complete wetting of all filaments within the raised group 170 and allows wetting of the upper surfaces of the filaments remaining in mass 140. This operation is repeated by again lifting another layer or group 170 of filaments from the mass 140 and applying curable material 174 between this group and the remaining filaments within the mass 140 in a manner shown in FIGURE 21b. This procedure is repeated until all filaments on one side or one half of mass 140 are completely coated with the plastic material 174. Thereafter, the tape 110 is turned over and this process is repeated to completely coat all filaments in the other half of mass 140. After this coating procedure has been completed, the filaments are formed into a somewhat coherent mass 180 of filaments completely coated by the curable material. See FIGURE 21c. In this condition, the tape 110 is ready to be placed within a mold in accordance with the present invention.

This mold is illustrated in FIGURE 22 and includes a lower mold segment 190 and an upper mold segment 192. Segment 190 includes a support plate 194 which receives a contoured side wall 196 having a diverging surface 198, best shown in FIGURES 23 and 24. At the end of side wall 196 there is provided an end rail 200. At either end of the side wall 196 there is provided spacer blocks 202, 204 which are utilized for determining transverse widths of the final lug 114, in a manner to be hereinafter described in detail.

The upper mold segment 192 includes a support plate 210 having a contoured side wall 212 with a diverging surface 214. At one end of side wall 212 there is provided an end rail 216, similar to end rail 200 of segment 190. Referring now to FIGURE 23, the mold segments 190, 192 are placed together to define a mold cavity 220 with diverging surfaces 198, 214 terminating in a transversely extending slot 222, defined by end rails 200, 216. The segments 190, 192 are clamped together by an appropriate means represented by arrows a. This means may take a variety of forms; however, in practice a vise is utilized for clamping the segments together. The mold segments 190, 192 are shown in FIGURE 23 in a slightly spaced condition. The clamping device can be used to compact the mass 180 into a form determined by the internal surfaces of cavity 220. When the segments are moved into their final position, the spacer blocks 202, 204 contact support plates 210 to determine the spacing between diverging surfaces 198, 214 and the width of slot 222. The width of this slot substantially matches the thickness of tape 110 and surfaces 198, 214 correspond to the desired contour to be applied onto the outer surface of lug 114.

Before the segments 190, 192 are clamped together, the tape 110 is placed between these segments, as shown in FIGURE 23, with the mass 180 of coated filaments being substantially opposite the surfaces 198, 214. After the tape is in this position, the mold segments are clamped together as shown in FIGURE 24.

Referring now to FIGURE 24, the tape 110 is drawn downwardly between the clamped segments 190, 192, as indicated by arrow b. This drawing down or pulling of the tape brings the initial unwoven portions of the longitudinally extending strands into the general vicinity of slot 222 and further compacts the filaments within the mass 180. Drawing or pulling of the tape through slot 222 must be done with care so that the unwoven portion of the tape is not drawn appreciably through the slot and outside of the mold cavity 220. If the tape is drawn too far through the slot 222, the tape must be removed from the mold and reinserted from the top. The tape cannot be forced upwardly through slot 222 without disarranging the oriented filaments.

After the tape is in the proper position within the mold and the mold is properly clamped, a number of heating lamps 230, 232 are focused onto the mold so that the mold may be heated to the proper curing temperature for the material in mass 180. After the necessary time has lapsed for curing of the material, the tape 110 may be removed from the mold cavity by separating segments 190, 192. It is appreciated that an appropriate releasing agent may be coated on the inner surfaces of cavity 220, so that release of the lug therefrom is facilitated.

After the tape has been removed from the mold cavity 220, the lug 114 may be contoured in any manner, such as that shown in FIGURE 15. This contouring can be done by a rough rasp, or another such instrument.

In the past, the coating of the strands or filaments within lug 114 has been attempted by either a simple dipping of the strands within a plastic material or by pouring the plastic material over the strands, after the strands were within a mold cavity. It has been found that each of these prior attempts to form a plastic lug on the end of the longitudinally extending strands is not appropriate for a tape formed from a plurality of longitudinal strands each including a multitude of small individual filaments. Neither the dipping or pouring process, heretofore suggested, would sufficiently wet all surfaces of these small filaments to tightly bond the lug to all surfaces of the filaments. Consequently, the invention as described above is a substantial advance in the art of forming plastic lugs on the end of a tape formed from interweaved longitudinally and transversely extending strands.

Only by practicing this invention has it been possible to utilize a plastic or molded lug on the end of a flat tape or band, when the lug must bear tremendous stresses, such as those found when the tape is utilized for arresting an aircraft on a runway. Without practicing the present invention, which includes the step of completely wetting all filaments within the tape, a plastic lug molded onto the end of the tape did not have sufficient strength for this particular application, or for other similar high strength applications. For this reason, the present invention has revolutionized the coupling design for aircraft arresting gear. Heretofore aircraft arresting gear used a complicated mechanical coupling having various expensive clamping structures which added substantially to the cost of the coupling.

The present invention has been described in connection with certain structural embodiments; however, it is appreciated that these embodiments may be modified without departing from the intended spirit and scope of the present invention.

What is claimed is:

1. A method of forming an attaching lug on the terminal end of a woven elongated member formed from a plurality of interweaved plastic strands, each strand being formed of many filaments, said method comprising the steps of: unweaving the strands adjacent said terminal end whereby said filaments unravel; orienting said filaments; coating said unwoven filaments with a curable material; providing a mold having opposite diverging side walls terminating at the converging ends of said side walls in an opening generally matching the cross-section of said member; placing said member into said mold with said member extending through said opening and said terminal end opposite said diverging side walls; pulling said member a short distance through said opening so that the unwoven portion of said member is not drawn appreciably through said opening and outside said mold to force said coated filaments against said side walls; curing said material while said member is in said pulled position; and, then removing said member from said mold.

2. A method of forming an attaching lug on the terminal end of a tape formed from a plurality of interweaved longitudinally and transversely extending plastic strands, each strand being formed of many filaments, said method comprising the steps of: unweaving the longitudinally extending strands adjacent said terminal end whereby said filaments unravel; orienting said longitudinally extending filaments; coating said unwoven, longitudinally extending filaments with a curable material; providing a mold having opposite diverging side walls terminating at the converging ends of said side walls in a slot-like opening; placing said tape into said mold with said tape extending through said opening and said terminal end opposite said diverging side walls; moving said side walls together to compact said coated strands; pulling said tape a short distance through said opening so that the unwoven portion of said member is not drawn appreciably through said opening and outside said mold to force filaments against said side walls; curing said material while said tape is in said pulled position; and, then, removing said tape from said mold.

3. A method of forming an attaching lug on the terminal end of a tape formed from a plurality of interweaved longitudinally and transversely extending plastic strands, each strand being formed from a large number of filaments, said method comprising the steps of: removing the transversely extending strands adjacent said terminal end leaving a mass of unoriented longitudinally extending filaments; separating some of said filaments from said mass; working a curable material into said separated filaments; repeating said separating and working steps until all filaments have been separated and coated with said material; providing a mold having opposite side walls terminating at the converging ends of said side walls in a slot-like opening; placing said tape into said mold with said tape extending through said opening and said terminal end opposite said diverging side walls; curing said material while said tape is in said mold; and, then, removing said tape from said mold.

4. A method as defined in claim 3 including the further step of: pulling said tape a short distance through said opening before said material is cured so that the unwoven portion of said tape is not drawn appreciably through said opening and outside said mold to force said filaments against said side walls.

5. A method as defined in claim 3 including the further step of: moving said side walls together to compact said coated filaments.

References Cited

UNITED STATES PATENTS

| | | |
|---|---|---|
| 215,231 | 4/1879 | Manly. |
| 2,563,829 | 8/1951 | Fitzgerald _____ 264—271 X |
| 2,827,618 | 3/1958 | Chapman _____ 264—271 X |
| 2,973,501 | 2/1961 | Mapelsden _____ 264—271 X |
| 3,093,434 | 6/1963 | Francis _____ 264—272 X |
| 3,187,081 | 6/1965 | Bollmeier _____ 264—272 X |
| 3,195,939 | 7/1965 | Lagarde _____ 287—82 |
| 3,258,831 | 7/1966 | Angele _____ 29—155.55 |
| 3,264,017 | 8/1966 | Lagarde _____ 287—82 |
| 2,319,537 | 5/1943 | Delmonte _____ 264—135 |
| 2,336,675 | 12/1943 | Damon _____ 264—135 |
| 2,689,389 | 9/1954 | Sunderland _____ 24—122.6 |

FOREIGN PATENTS

| | | |
|---|---|---|
| 804,154 | 7/1936 | France. |
| 1,204,191 | 8/1959 | France. |
| 892,884 | 4/1962 | Great Britain. |

ROBERT F. WHITE, *Primary Examiner.*

RICHARD R. KUCIA, *Assistant Examiner.*

U.S. Cl. X.R.

264—271